United States Patent
Kato et al.

(10) Patent No.: US 12,488,924 B2
(45) Date of Patent: Dec. 2, 2025

(54) MAGNETIZING DEVICE

(71) Applicant: HONDA MOTOR CO., LTD., Tokyo (JP)

(72) Inventors: Toshitaka Kato, Wako (JP); Shinji Nemoto, Wako (JP); Tokio Taira, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 18/439,790

(22) Filed: Feb. 13, 2024

(65) Prior Publication Data
US 2024/0290527 A1   Aug. 29, 2024

(30) Foreign Application Priority Data
Feb. 24, 2023   (JP) .................. 2023-027108

(51) Int. Cl.
*H01F 13/00* (2006.01)
*H01F 27/06* (2006.01)
*H01F 27/30* (2006.01)

(52) U.S. Cl.
CPC ............. *H01F 13/00* (2013.01); *H01F 27/06* (2013.01); *H01F 27/30* (2013.01)

(58) Field of Classification Search
None
See application file for complete search history.

(56) References Cited

U.S. PATENT DOCUMENTS

| 7,779,532 B2* | 8/2010 | Sakamoto | H02K 15/03 29/598 |
| 9,082,546 B2* | 7/2015 | Komura | H01F 13/003 |
| 2023/0307999 A1* | 9/2023 | Kato | H02K 15/03 |
| 2023/0318413 A1* | 10/2023 | Kato | H02K 15/03 29/598 |
| 2024/0291338 A1* | 8/2024 | Taira | H02K 1/12 |

FOREIGN PATENT DOCUMENTS

| JP | 06-038459 | 2/1994 |
| JP | 2005-224055 | 8/2005 |

* cited by examiner

*Primary Examiner* — Bernard Rojas
(74) *Attorney, Agent, or Firm* — Amin, Turocy & Watson, LLP

(57) ABSTRACT

A magnetizing device includes at least one coil unit that generates a magnetic field. The coil unit includes a support, a coil wound around an outer circumferential surface of the support, and a fiber reinforced resin. The fiber reinforced resin is wound around the coil to prevent deformation of the coil in a direction away from a central axis of the coil.

9 Claims, 7 Drawing Sheets

MAGNETIZING DEVICE

CROSS-REFERENCE TO RELATED APPLICATIONS

This application is based upon and claims the benefit of priority from Japanese Patent Application No. 2023-027108 filed on Feb. 24, 2023, the contents of which are incorporated herein by reference.

BACKGROUND OF THE INVENTION

Field of the Invention

The present invention relates to a magnetizing device.

Description of the Related Art

In recent years, efforts directed toward realizing a low-carbon or a decarbonized society have become more active. In respect to vehicles as well, research and development in relation to electrification technology are also being conducted in order to reduce $CO_2$ emissions and to improve energy efficiency. For this reason, electric vehicles, which do not emit greenhouse gases and are superior in terms of environmental performance, are attracting attention. An electric vehicle is equipped with a high-output motor as a drive source. In addition, electrification of aircraft and work equipment is being promoted, and in the field of general-purpose equipment, replacement of engines with motors is being promoted.

Among the motors, the PM motor having permanent magnets in its rotor is said to be superior in efficiency and environmental performance. The rotor used for such a motor has a magnetization process for magnetizing a permanent magnet at the final stage of the manufacturing process. For example, JP 2005-224055 A discloses a magnetizing device for multipole permanent magnets arranged alongside one another in a rotor.

SUMMARY OF THE INVENTION

The magnetizing device includes a coil. In the magnetizing step, an electric current is made to flow through the coil to generate a magnetic field around the coil, and the magnetic field magnetizes a magnetic body. At this time, because of a magnetic field generated by one coil side and an electric current flowing through another coil side facing the one coil side across the central axis of the coil, an electromagnetic force acts on the other coil side. As a result, the coil deforms due to the electromagnetic force. When the magnetic field fluctuates due to the deformation of the coil, it becomes difficult to magnetize the magnetic bodies properly.

An object of the present invention is to solve the above-described problems.

An aspect of the present invention is a magnetizing device configured to magnetize a plurality of magnetic bodies by applying a magnetic field with respect to a rotor having the plurality of magnetic bodies arranged in a circumferential direction, the magnetizing device including at least one coil unit that generates the magnetic field, wherein the coil unit includes a support, a coil wound around an outer circumferential surface of the support, and a fiber reinforced resin wound around the coil to prevent deformation of the coil in a direction away from the central axis of the coil.

According to the present invention, a coil is wound around the outer circumferential surface of the support, and a fiber reinforced resin is wound around the coil to prevent the coil from deforming in the direction away from the central axis of the coil. This prevents the coil from being deformed by the electromagnetic force caused by the electric current and the magnetic field when the magnetic field is generated by the electric current passing through the coil. As a result, the durability of the coil unit can be improved. In addition, because of the fiber reinforced resin, the deformation of the coil can be prevented without affecting the magnetic field.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
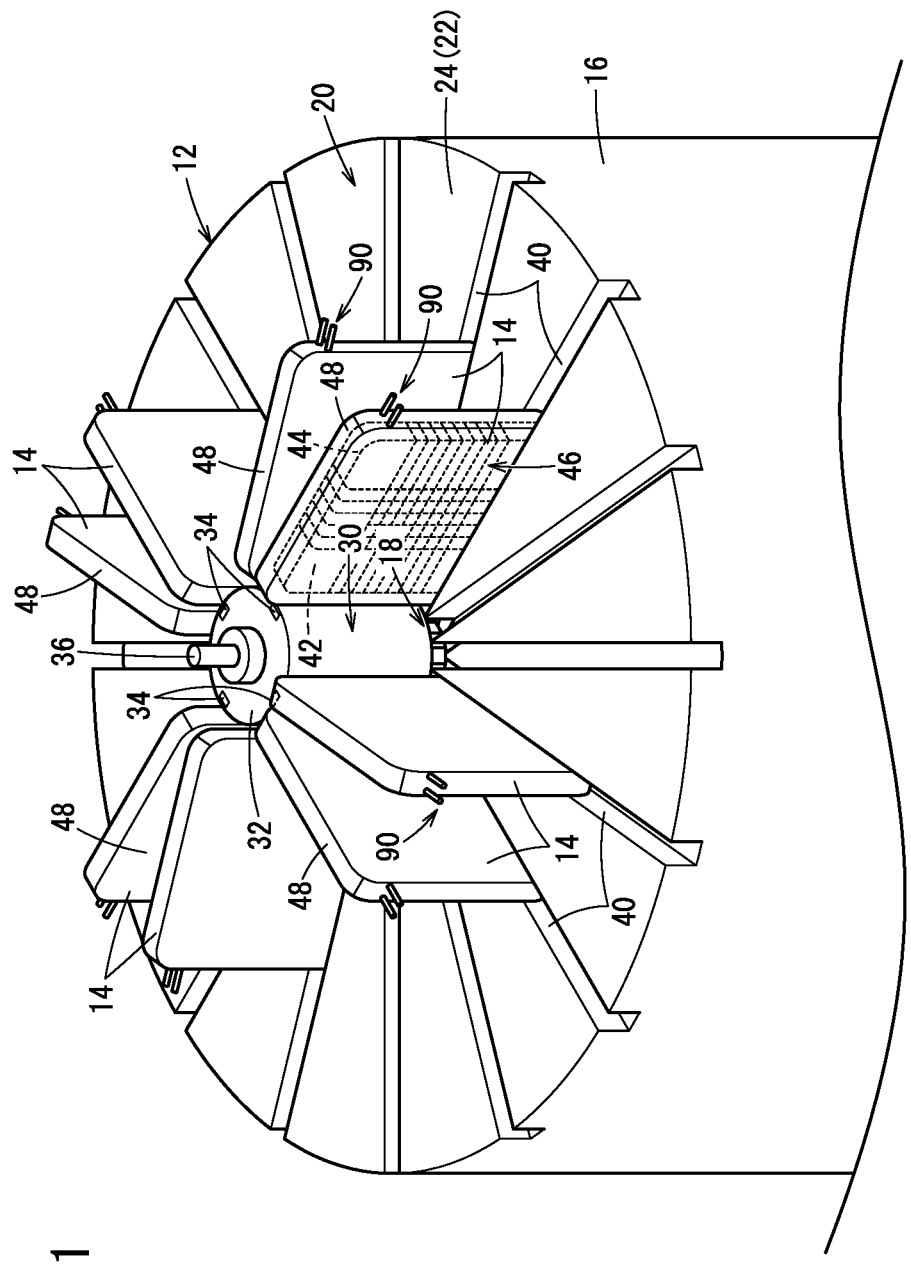
FIG. 1 is a perspective view of a magnetizing device according to the present embodiment.

FIG. 1 is a perspective view of a magnetizing device 10 according to the present embodiment.

The magnetizing device 10 according to the present embodiment includes a holding unit 12 and a plurality of coil units 14.

The holding unit 12 has a holding member 16, a rotor fixing portion 18, and a coil fixing portion 20.

The holding member 16 is a cylindrical member. An upper surface 22 of the holding member 16 is a flat mounting surface 24. The rotor fixing portion 18 and the coil fixing portion 20 are provided on the mounting surface 24.

Figure 4:
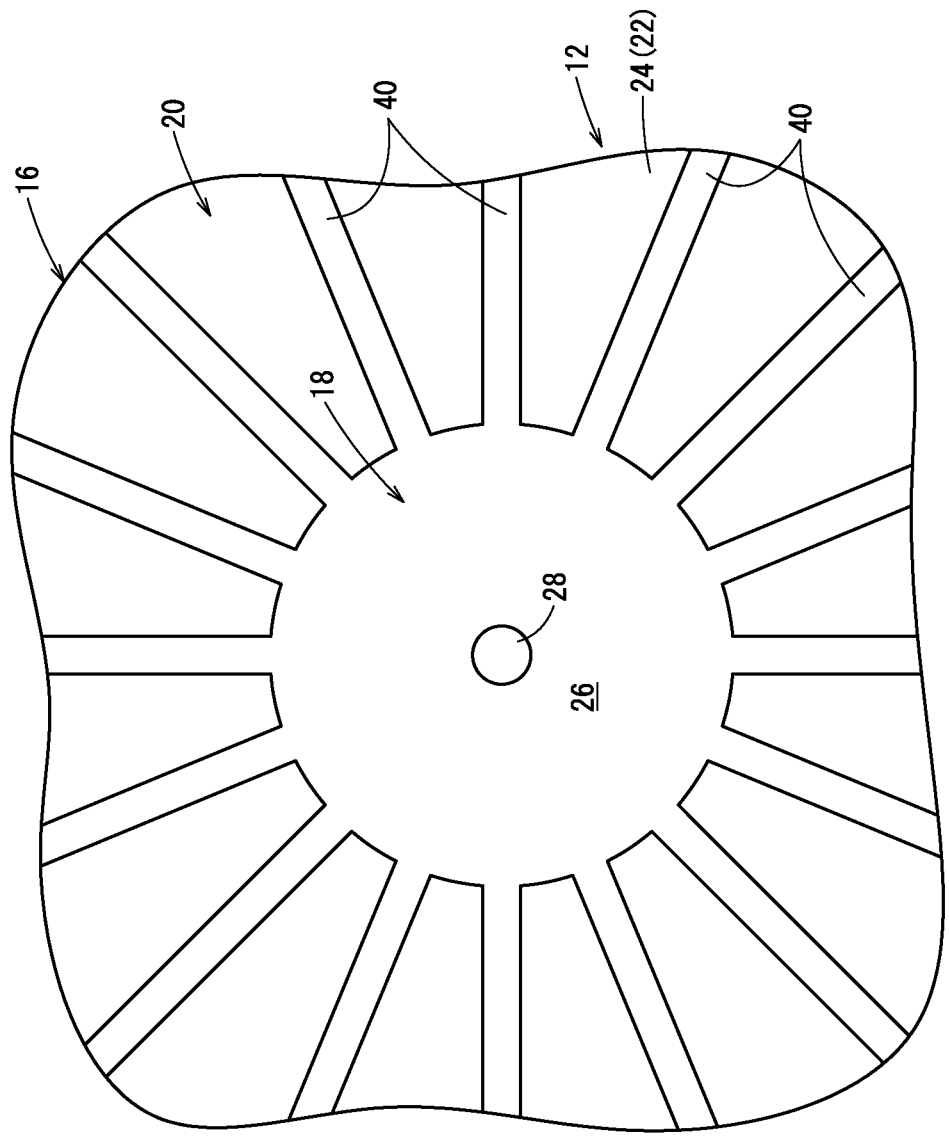
FIG. 4 is a plan view of a holding member of FIG. 1.

The rotor fixing portion 18 is provided at a central portion of the mounting surface 24. As shown in FIG. 4, the rotor fixing portion 18 has a concave portion 26 and a fixing pin 28. The concave portion 26 is a circular concave portion that is depressed from the mounting surface 24 in the axial direction of the holding member 16. The fixing pin 28 projects from the central portion of the concave portion 26 in the axial direction of the holding member 16. As shown in FIG. 1, a rotor 30 is fixed to the rotor fixing portion 18.

Figure 5:
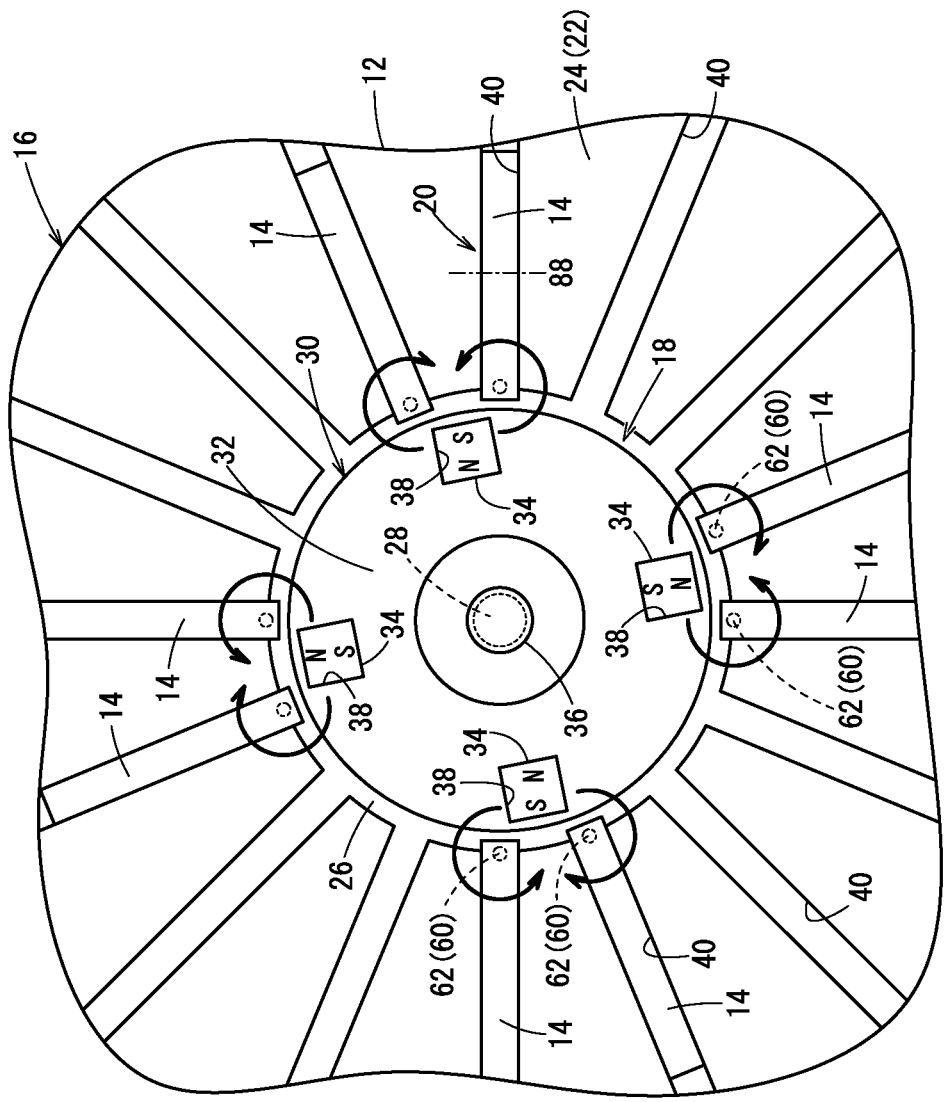
FIG. 5 is a diagram for explaining the operation of the magnetizing device of FIG. 1.

The rotor 30 is used for a PM motor, for example. As shown in FIG. 5, the rotor 30 has a rotor main body 32 and a plurality of magnetic bodies 34. The rotor main body 32 is a cylindrically shaped member made of a soft magnetic material. A shaft 36 penetrates the central portion of the rotor main body 32 in the axial direction of the rotor 30. One end of the shaft 36 projects in the axial direction from one end of the rotor 30 along the axial direction of the rotor 30. The other end of the shaft 36 projects in the axial direction from the other end of the rotor 30. A concave portion (not shown) that can engage with the fixing pin 28 is formed at the other end of the shaft 36.

A plurality of accommodation holes 38 are formed on an outer circumferential side of the rotor main body 32. The plurality of accommodation holes 38 are formed at an equal interval in the circumferential direction of the rotor main body 32. Each of the plurality of accommodation holes 38 passes in the axial direction through the rotor main body 32.

The magnetic bodies 34 are inserted into each of the plurality of accommodation holes 38. Each of the plurality of magnetic bodies 34 is fixed to the rotor main body 32 by being sealed by means of a non-illustrated resin in a state of being inserted into the accommodation holes 38. The plurality of magnetic bodies 34 are magnetic bodies that serve as objects to be magnetized by the magnetizing device 10. The plurality of magnetic bodies 34 are hard magnetic bodies. The plurality of magnetic bodies 34 become permanent magnets due to being magnetized by the magnetizing device 10.

The number of magnetic bodies 34 arranged in the circumferential direction is the same as the number of poles of the rotor 30. Each of the magnetic bodies 34 is magnetized in the radial direction in a manner so that the outer circumferential side becomes an N pole or an S pole, for example. The rotor 30 is magnetized in a manner so that a magnetic body 34 magnetized to the N pole on the outer circumferential side and a magnetic body 34 magnetized to the S pole on the outer circumferential side alternately appear in the circumferential direction.

According to the present embodiment, for example, four of the accommodation holes 38 are formed in the rotor main body 32. Specifically, as viewed in plan, the four accommodation holes 38 are formed at an interval of 90° in the circumferential direction of the rotor 30. Accordingly, four individual magnetic bodies 34 are accommodated in the rotor main body 32 at an interval of 90° in the circumferential direction of the rotor 30. The rotor 30 may be used for an SPM motor. Further, the number of the magnetic bodies 34 (the number of poles of the rotor 30) is not limited to being four. For example, the number of magnetic bodies 34 (the number of poles of the rotor 30) may be 8.

In the rotor fixing portion 18, the inner diameter of the concave portion 26 is slightly larger than the outer diameter of the rotor 30. The diameter of the fixing pin 28 is slightly smaller than the inner diameter of the concave portion of the shaft 36. The entire length of the fixing pin 28 along the axial direction of the rotor 30 is shorter than the depth of the concave portion 26. The rotor 30 is inserted into the concave portion 26, and the concave portion of the shaft 36 and the fixing pin 28 are fitted to each other, whereby the rotor 30 is fixed to the rotor fixing portion 18.

The coil fixing portion 20 has a plurality of groove portions 40. The groove portions 40 extend radially from the concave portions 26 on the mounting surface 24 of the holding member 16. The plurality of groove portions 40 are formed at predetermined angular intervals along the circumferential direction of the holding member 16. The groove portions 40 have the same width and the same depth. Each of the groove portions 40 is capable of holding a coil unit 14. As shown in FIG. 1, each of the coil units 14 is in a flat-plate shape. The coil units 14 have the same shape, the same size, and the same thickness. The coil unit 14 is held in the groove portion 40 by inserting the flat coil unit 14 into each of the groove portions 40.

In each of the groove portions 40, the holding position of the coil unit 14 along the radial direction of the holding member 16 can be changed by sliding the coil unit 14 held in the groove portion 40 along the groove portion 40. In addition, in this embodiment, the number of the groove portions 40 is not particularly limited. It can be an even number such as 4, 6, . . . , for example. The groove portions 40 may be formed at equal intervals in the circumferential direction.

Figure 2:
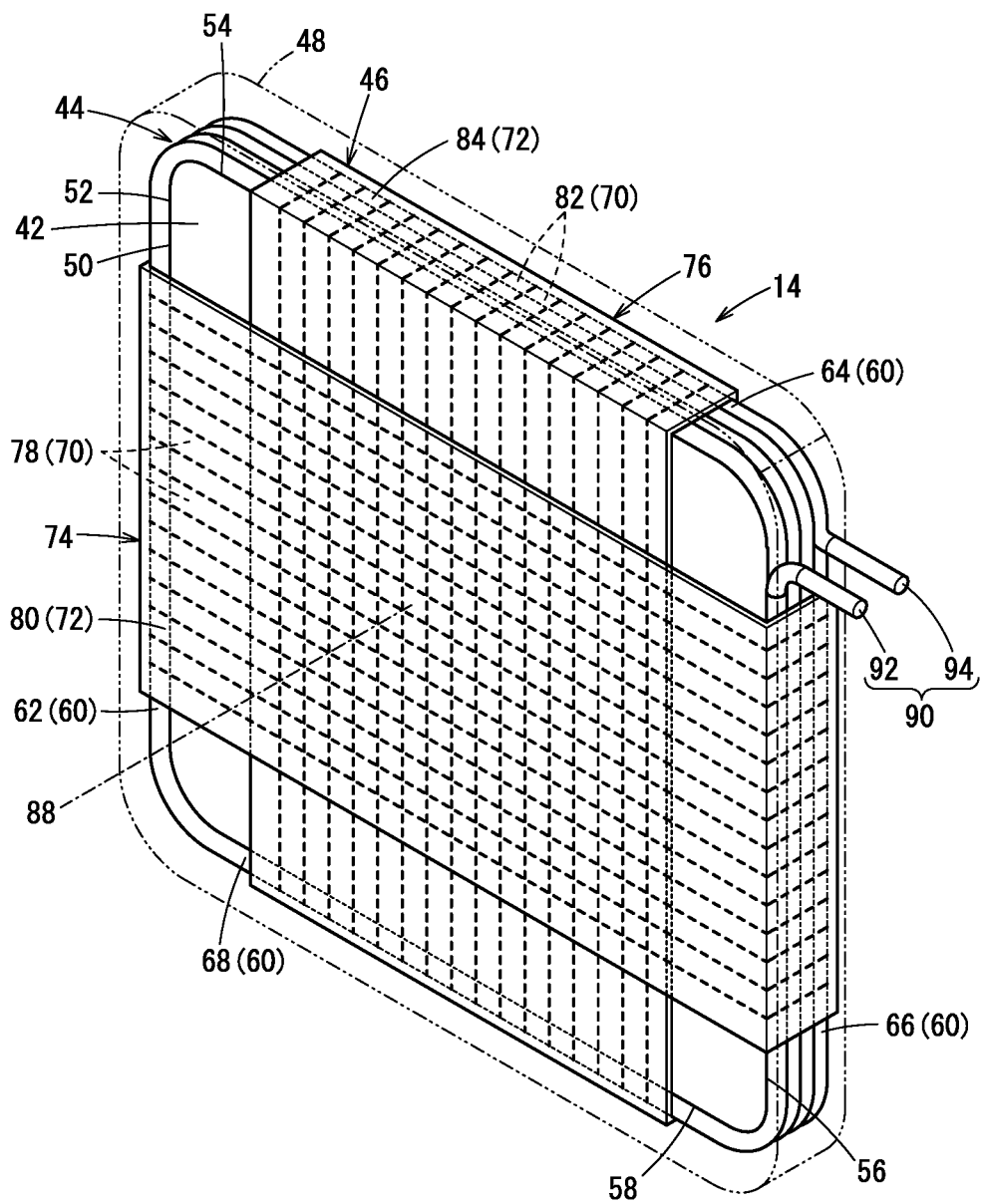
FIG. 2 is a perspective view of a coil unit of FIG. 1.

The coil unit 14 has a substantially rectangular plate shape. As shown in FIG. 2, the coil unit 14 has a support 42, a coil 44, a fiber reinforced resin 46, and a covering portion 48.

Figure 3A:
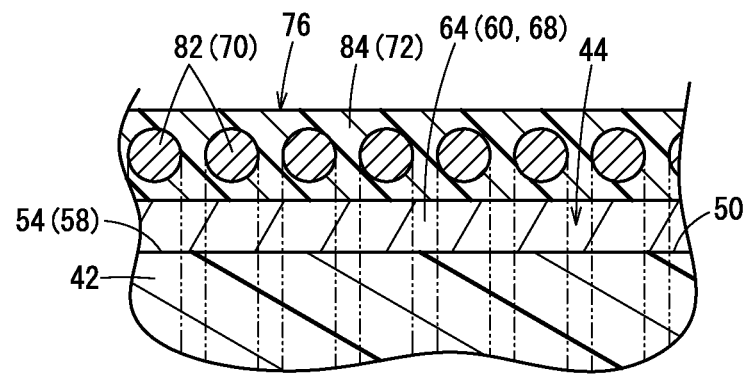
FIGS. 3A and 3B are partial cross-sectional views of the coil unit of FIG. 1.
Figure 3B:
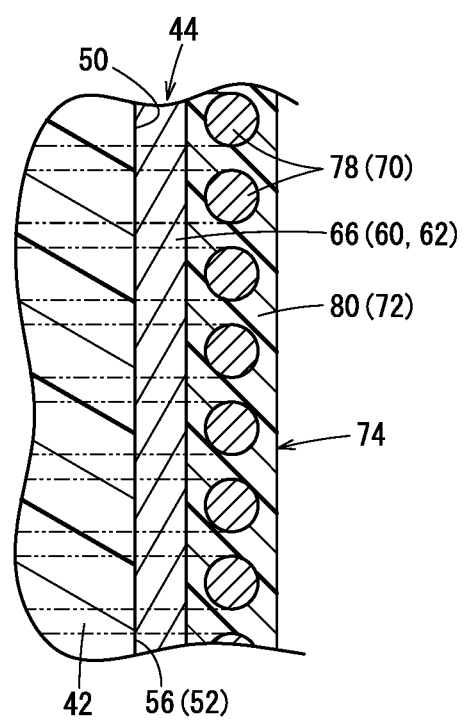

As shown in FIGS. 2 to 3B, the support 42 is a member formed of a non-magnetic material such as resin. The support 42 is a rectangular plate. An outer circumferential surface 50 of the support 42 is constituted by four side surfaces (first side surface 52, second side surface 54, third side surface 56, and fourth side surface 58). One end of the first side surface 52 is coupled to one end of the second side surface 54. Another end of the first side surface 52 is coupled to one end of the fourth side surface 58. The second side surface 54 and the fourth side surface 58 are parallel to each other. The second side surface 54 and the fourth side surface 58 face each other. One end of the third side surface 56 is coupled to another end of the second side surface 54. Another end of the third side surface 56 is coupled to another end of the fourth side surface 58. The first side surface 52 and the third side surface 56 are parallel to each other. The first side surface 52 and the third side surface 56 face each other.

Corner portions of the support 42 is formed in an arc shape. Therefore, in practice, the first side surface 52, the second side surface 54, the third side surface 56, and the fourth side surface 58, which constitute the outer circumferential surface 50, are connected via the arc-shaped corner portions.

The coil 44 is wound around the outer circumferential surface 50 of the support 42. As noted above, the support 42 is rectangular, and thus the shape of the coil 44 is also rectangular. That is, the coil 44 has a plurality of coil sides 60 (first coil side 62, second coil side 64, third coil side 66, fourth coil side 68). The first coil side 62 extends along the first side surface 52. The second coil side 64 extends along the second side surface 54. Third coil side 66 extends along the third side surface 56. Fourth coil side 68 extends along the fourth side surface 58. One end of the first coil side 62 is coupled to one end of the second coil side 64. Another end of the first coil side 62 is coupled to one end of the fourth coil side 68. Another end of the second coil side 64 is coupled to one end of the third coil side 66. Another end of the fourth coil side 68 is coupled to another end of the third coil side 66.

As described above, since the corner portion of the support 42 is formed in an arc shape, the portion of the coil 44 that extends along the corner portion of the support 42 is formed in an arc shape. Therefore, the first coil side 62, the second coil side 64, the third coil side 66, and the fourth coil side 68 are actually coupled via the arc-shaped portions of the coil 44.

A fiber reinforced resin 46 is wrapped around the coil 44 so as to prevent deformation of the coil 44 in a direction away from the central axis 88 of the coil 44. As shown in FIGS. 3A and 3B, the fiber reinforced resin 46 is formed by mixing a reinforcing fiber 70 with a resin 72. The resin 72 is, for example, an epoxy resin or a phenolic resin. The fiber 70 is, for example, a carbon fiber or a glass fiber. Thus, the fiber reinforced resin 46 is, for example, a carbon fiber reinforced resin or a glass fiber reinforced resin. In this embodiment, the fiber reinforced resin 46 is preferably a carbon fiber reinforced resin.

As shown in FIG. 2, the fiber reinforced resin 46 has a first band-shaped body 74 and a second band-shaped body 76. The first band-shaped body 74 and the second band-shaped body 76 are band-shaped fiber reinforced resins.

As shown in FIGS. 2 and 3B, the first band-shaped body 74 has first fiber 78 as the fiber 70 and first resin 80 as the resin 72. The first band-shaped body 74 is formed by arranging a plurality of first fibers 78 extending in one direction in the width direction inside the first resin 80.

As shown in FIGS. 2 and 3A, the second band-shaped body 76 has second fiber 82 as the fiber 70 and second resin 84 as the resin 72. The second band-shaped body 76 is formed by arranging a plurality of second fibers 82 extending in one direction in the width direction inside the second resin 84.

As shown in FIG. 2, the first band-shaped body 74 is wound around the support 42 and the coil 44 so as to extend between the first coil side 62 and the third coil side 66. Specifically, the first band-shaped body 74 is wound around the support 42 and the coil 44 so as to cross the central axis 88 of the coil 44 and to extend between a central portion of the first coil side 62 and a central portion of the third coil side 66. In this case, the direction of the first fiber 78 is the same as the winding direction of the first band-shaped body 74 with respect to the support 42 and the coil 44.

The second band-shaped body 76 is wound around the support 42 and the coil 44 so as to extend between the second coil side 64 and the fourth coil side 68. Specifically, the second band-shaped body 76 is wound around the support 42 and the coil 44 so as to cross the central axis 88 of the coil 44 and to extend between a central portion of the second coil side 64 and a central portion of the fourth coil side 68. In this case, the direction of the second fiber 82 is the same as the winding direction of the second band-shaped body 76 with respect to the support 42 and the coil 44.

Thus, the first band-shaped body 74 and the second band-shaped body 76 intersect on the central axis 88 of the coil 44.

When the fiber reinforced resin 46 is a carbon fiber reinforced resin, it is desirable that the fiber reinforced resin 46 is wound around the coil 44 in a tensioned state. In this case, the first band-shaped body 74 is wound around the coil 44 in a state where tension is applied in the winding direction of the first band-shaped body 74. The second band-shaped body 76 is wound around the coil 44 in a state where tension is applied in the winding direction of the second band-shaped body 76.

As shown in FIGS. 1 and 2, the covering portion 48 covers the support 42, the coil 44, and the fiber reinforced resin 46. The covering portion 48 is made of resin.

The coil 44 further has a terminal portion 90. The terminal portion 90 includes one end 92 and another end 94 of the coil 44. The terminal portion 90 penetrates the covering portion 48 and protrudes to the outside. Wires (not shown) are connected to the terminal portion 90.

As shown in FIG. 5, the coil units 14 are arranged around the rotor 30 so as to face the magnetic bodies 34. Specifically, the coil units 14 are inserted into the groove portions 40 in a manner so that two of the coil units 14 face one magnetic body 34. Therefore, in the magnetizing device 10, eight coil units 14 are arranged for four magnetic bodies 34. At this time, each of the coil units 14 is arranged around the rotor 30 in a manner so that the first coil side 62 and the third coil side 66 (see FIG. 2) extend in the axial direction of the rotor 30 and are separated from each other in the radial direction of the rotor 30. That is, each of the coil units 14 is arranged around the rotor 30 in a manner so that the central axis 88 (see FIG. 2) of the coil 44 is directed in the circumferential direction of the rotor 30. FIG. 5 illustrates a case where the first coil side 62 faces the magnetic body 34.

In the magnetizing device 10, when an electric current is applied to the coil 44 from the outside via the terminal portion 90 (see FIG. 2), a magnetic field in a concentric circular shape is generated around the coil side 60 of the coil 44 according to the right hand cork screw rule with respect to the direction of the electric current. In this embodiment, the magnetic field in a concentric circular shape generated around the first coil side 62 facing a magnetic body 34 is utilized for magnetizing the magnetic body 34.

In the magnetizing device 10, the number of coil units 14 is the same as or larger than the number of poles (the number of magnetic bodies 34) of the rotor 30. For example, FIG. 5 illustrates the case where two coil units 14 are used for one magnetic body 34. The use of two coil units 14 for one magnetic body 34 allows the magnetic body 34 to be efficiently magnetized.

The magnetizing device 10 of the present embodiment is configured as described above. Next, the operation of the magnetizing device 10 will be described.

First, the same number or more of coil units 14 as the number of poles (the number of magnetic bodies 34 in the circumferential direction) of the rotor 30 to be magnetized are prepared. For example, as shown in FIG. 5, when magnetization is performed for a four-pole rotor 30, eight coil units 14 are prepared for four magnetic bodies 34.

Next, the coil unit 14 is fixed to the magnetizing device 10. In this case, a predetermined number of coil units 14 are fitted in the plurality of groove portions 40. The position of the coil unit 14 in the radial direction of the rotor 30 is adjusted in a manner so that the inner circumferential end of the coil unit 14 (an end portion on the first coil side 62 side) is positioned in the vicinity of the outer circumferential portion of the rotor 30. The coil unit 14 is allowed to slide in the radial direction of the rotor 30 along the groove portion 40. This facilitates positioning of the coil unit 14 with respect to the radial direction of the rotor 30.

Next, the rotor 30 is fixed to the rotor fixing portion 18 of the holding member 16 where the plurality of coil units 14 have been arranged. In this case, the rotor 30 is inserted into the concave portion 26 of the rotor fixing portion 18, and the concave portion of the shaft 36 and the fixing pin 28 are fitted to each other, whereby the rotor 30 is fixed to the rotor fixing portion 18. At this time, the circumferential positioning of the rotor 30 is performed in a manner so that each of the magnetic bodies 34 faces two of the coil units 14. Thereby, two coil units 14 are arranged adjacent to each other for one magnetic body 34.

Next, the plurality of magnetic bodies 34 are magnetized. Specifically, the electric current is supplied to the coil units 14. In this case, the electric current is supplied to the coil units 14 in a manner so that two adjacent coil units 14 for one magnetic body 34 generate magnetic fields in opposite directions to each other. As a result, a concentric magnetic field is generated around the first coil side 62 of each of the two coil units 14 according to the right hand cork screw rule. Two magnetic fields in concentric circles by two adjacent coil units 14 apply a radially inward magnetic field or a radially outward magnetic field to the magnetic body 34 facing the two coil units 14. Thereby, the magnetic body 34 is magnetized radially inward or radially outward. As a result, the magnetic bodies 34 are magnetized in a manner so that a magnetized magnetic body 34 with the radially outer side being an N pole and a magnetized magnetic body 34 with the radially outer side being an S pole appear alternately in the circumferential direction.

After the magnetization operation on the magnetic bodies 34 is completed, the rotor 30 is removed from the holding member 16.

The present embodiment has the following benefits.

Figure 6A:
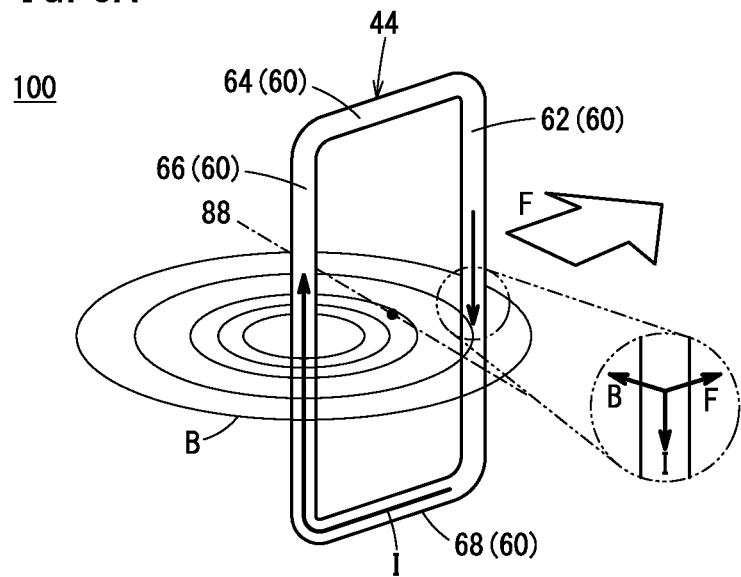
FIGS. 6A and 6B are views showing coil units of comparative examples.

FIG. 6A shows a coil unit 100 of a comparative example. In the coil unit 100, the same components as those of the coil unit 14 (see FIG. 2) in the present embodiment are denoted by the same reference numerals. In FIG. 6A, the support 42 is not shown. The coil unit 100 is not provided with the fiber reinforced resin 46 and the covering portion 48 in comparison with the coil unit 14 (see FIG. 2) of the present embodiment.

In the coil unit 100, when the electric current is applied to the coil 44 to magnetize the magnetic body 34 (see FIG. 5), because of a magnetic field generated by one coil side 60 and an electric current flowing through another coil side 60 facing the one coil side 60 across the central axis 88 of the coil 44, an electromagnetic force acts on the other coil side 60. For example, an electromagnetic force F acts on the first coil side 62 due to a magnetic field (magnetic flux density B) generated around the second coil side 64 and an electric current I flowing through the first coil side 62. Since the electric current I flows through each coil side 60 of the coil 44, the electromagnetic force F also acts on each coil side 60 other than the first coil side 62.

Figure 6B:
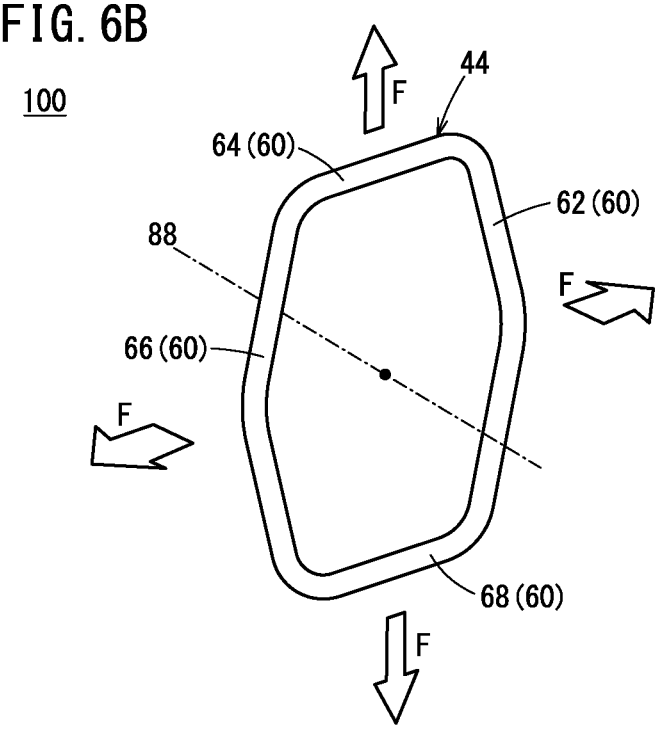

In the coil unit 100, the electromagnetic force F acts on the coil 44, and thus the coil 44 is deformed by the electromagnetic force F as shown in FIG. 6B. FIG. 6B illustrates a case where the central portions of the first coil side 62 to the fourth coil side 68 are deformed outward by the electromagnetic force F acting on the first coil side 62 to the fourth coil side 68. In this way, the magnetic field generated around the coil 44 changes as the coil 44 deforms. The changes in the magnetic field make it difficult to magnetize the magnetic body 34 properly. In addition, the deformation of the coil 44 may cause breakage of the insulating film covering the coil 44, breakage of the coil 44, and the like. Furthermore, when the coil unit 100 is used for a long period of time, the coil unit 100 may deteriorate due to the deformation of the coil 44, whereby the life of the coil unit 100 may reduce.

To suppress such deformation of the coil 44, it is conceivable to house the coil 44 in a metal box or wind the coil 44 with a metal band. However, if a metal member is used, the magnetic field generated around the coil 44 is affected by the metal when an electric current is applied to the coil 44. In addition, in either case where the coil 44 is housed in a metal box or the coil 44 is wound by a metal band, a gap is created between the rotor 30 (see FIG. 5) and the coil 44 by the amount equal to the thickness of the metal plate. As a result, the magnetic field for magnetizing the magnetic body 34 reduces.

In contrast, in the case of the magnetizing device 10 (see FIG. 1) according to the present embodiment, as shown in FIG. 2, at the coil unit 14, the coil 44 is wound around the outer circumferential surface 50 of the support 42, and together therewith the fiber reinforced resin 46 is wound around the coil 44 so as to prevent the coil 44 from deforming in a direction away from the central axis 88 of the coil 44. This prevents the coil 44 from being deformed by the electromagnetic force due to the electric current and the magnetic field when the electric current is applied to the coil 44 to generate a magnetic field. As a result, the durability of the coil unit 14 can be improved. In addition, since the fiber reinforced resin 46 is used, the deformation of the coil 44 can be prevented without affecting the generated magnetic field. In addition, by winding the fiber reinforced resin 46 around the coil 44, it is possible to reduce the gap between the coil unit 14 and the rotor 30 in comparison with the case where the coil 44 is housed in a metal box or a metal band is wound around the coil 44.

In the coil unit 14, the first band-shaped body 74 is wound around the support 42 and the coil 44 so as to extend between the first coil side 62 and the third coil side 66. In the coil unit 14, the second band-shaped body 76 is wound around the support 42 and the coil 44 so as to extend between the second coil side 64 and the fourth coil side 68. This can efficiently prevent the coil 44 from being deformed by the outward electromagnetic force acting on the first coil side 62 to the fourth coil side 68 when a magnetic field is generated by the electric current passing through the coil 44.

In the coil unit 14, the first band-shaped body 74 is wound so as to cross the central axis 88 of the coil 44 and extend between the central portion of the first coil side 62 and the central portion of the third coil side 66. In the coil unit 14, the second band-shaped body 76 is wound so as to cross the central axis 88 of the coil 44 and extend between the central portion of the second coil side 64 and the central portion of the fourth coil side 68. This can reliably prevent the coil 44 from being deformed by the outward electromagnetic force acting on the first coil side 62 to the fourth coil side 68 when a magnetic field is generated by the electric current passing through the coil 44.

In the coil unit 14, as shown in FIGS. 2 and 3B, the direction of the fibers 70 (first fibers 78) forming the first band-shaped body 74 is the same as the winding direction of the first band-shaped body 74. In the coil unit 14, as shown in FIGS. 2 and 3A, the direction of the fibers 70 (second fibers 82) forming the second band-shaped body 76 is the same as the winding direction of the second band-shaped body 76. This can reliably prevent the coil 44 from being deformed by the outward electromagnetic force generated on the first coil side 62 to the fourth coil side 68 when a magnetic field is generated by the electric current passing through the coil 44.

As shown in FIGS. 2 and 5, in the coil unit 14, the first coil side 62 and the third coil side 66 extend in the axial direction of the rotor 30 and are separated from each other in the radial direction of the rotor 30. Thus, the plurality of coil units 14 can be appropriately arranged around the rotor 30 in correspondence with the size of the rotor 30 and the number of poles (the number of magnetic bodies 34) of the rotor 30, and together therewith the plurality of magnetic bodies 34 can be efficiently magnetized.

As shown in FIGS. 2 to 3B, in the coil unit 14, the fiber reinforced resin 46 is a carbon fiber reinforced resin, and therefore, the mechanical strength of the fiber reinforced resin 46 is improved. This can reliably prevent the coil 44 from being deformed by the electromagnetic force acting on the coil 44 when a magnetic field is generated by the electric current passing through the coil 44. In addition, even if the thickness of the fiber reinforced resin 46 is reduced, the mechanical strength sufficient to suppress the deformation of the coil 44 can be ensured. This can prevent the gap between the coil unit 14 and the rotor 30 from increasing. As a result, the strength of the magnetic field applied from the coil unit 14 to the rotor 30 can be ensured.

When the fiber reinforced resin 46 is a carbon fiber reinforced resin, the fiber reinforced resin 46 may be wound around the coil 44 while tension is applied. When the fiber reinforced resin 46 is wound around the coil 44 while tension is applied in the winding direction of the fiber reinforced resin 46, a compressive force acts on the carbon fiber reinforced resin causing the carbon fiber reinforced resin to tend to shrink. This increases the force that tries to prevent the deformation of the coil 44 (the force that tries to fix and hold the coil 44 on the support 42). As a result, deformation of the coil 44 can be further suppressed, and the mechanical strength of the coil unit 14 can be improved.

In the coil unit 14, the support 42, the coil 44 and the fiber reinforced resin 46 are covered by the covering portion 48. Thus, even if the fiber reinforced resin 46 is broken, the fibers 70 constituting the fiber reinforced resin 46 can be prevented from scattering. In addition, since the covering portion 48 is provided to prevent the scattering of the fibers 70, the thinness of the covering portion 48 may be such a degree that the support 42, the coil 44, and the fiber reinforced resin 46 can be covered. Therefore, the thickness of the covering portion 48 can be reduced in comparison with the case where the coil 44 is housed in a metal box or a metal band is wound around the coil 44. This can prevent the gap between the coil unit 14 and the rotor 30 from increasing.

Figure 7:
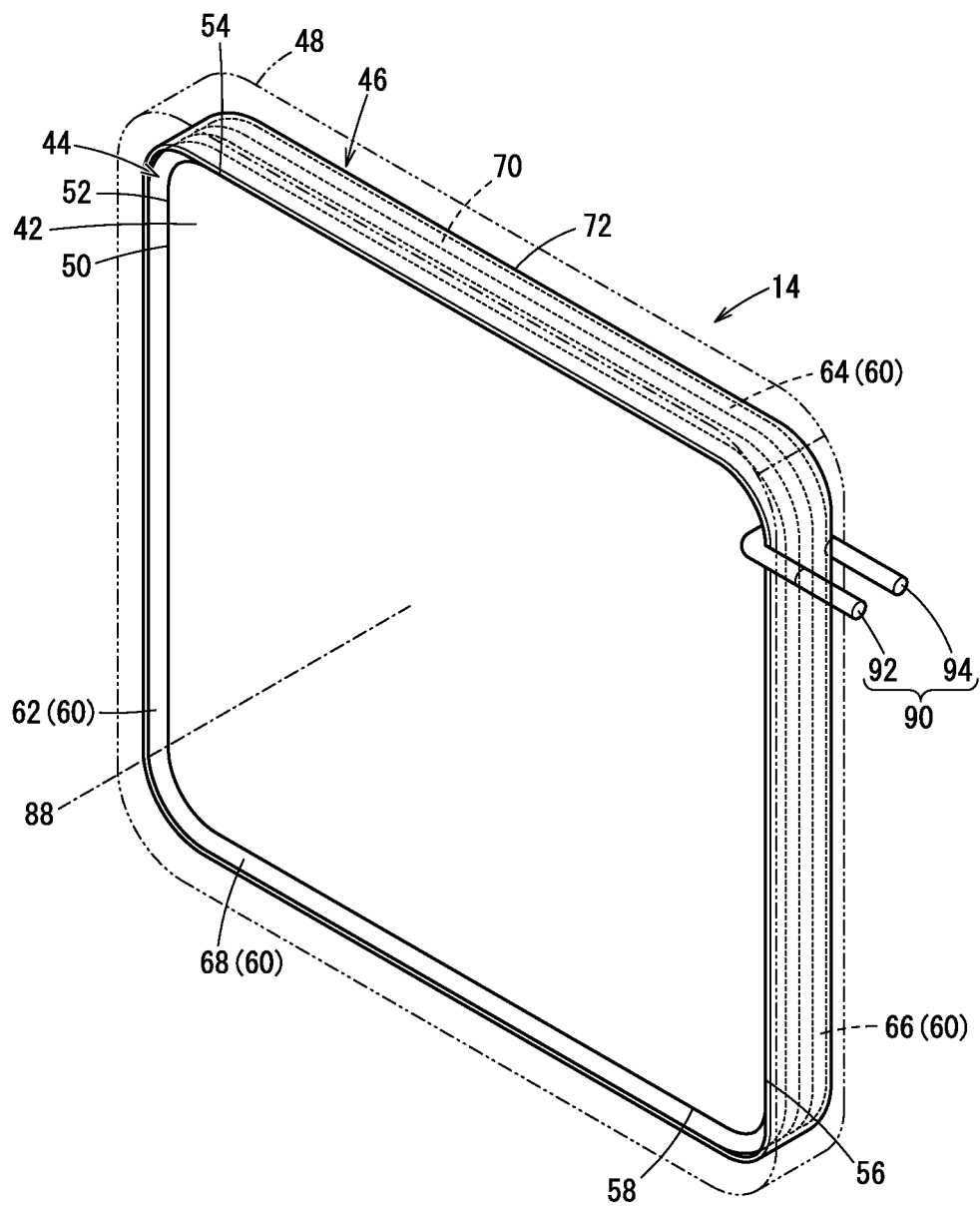
FIG. 7 is a perspective view of a coil unit in an exemplary modification.

In this embodiment, the coil unit 14 may be configured as in an exemplary modification shown in FIG. 7. In this exemplary modification, the fiber reinforced resin 46 is wrapped around the support 42 via the coil 44. That is, the fiber reinforced resin 46 is wound around the outer circumferential surface of the coil 44. That is, the fiber reinforced resin 46 is wound around the outer circumferential surface of the coil 44 along the winding direction of the coil 44. In the configuration of this exemplary modification, when a magnetic field is generated by the electric current passing through the coil 44, the coil 44 can also be prevented from being deformed by the electromagnetic force caused by the electric current and the magnetic field.

In relation to the above-described disclosure, the following supplementary notes are further disclosed.

Supplemental Note 1

A magnetizing device (10) configured to magnetize a plurality of magnetic bodies (34) by applying a magnetic field with respect to a rotor (30) having the plurality of magnetic bodies arranged in a circumferential direction, the magnetizing device comprising at least one coil unit (14) that generates the magnetic field, wherein the coil unit includes a support (42), a coil (44) wound around an outer circumferential surface (50) of the support; and a fiber reinforced resin (46) wound around the coil to prevent deformation of the coil in a direction away from a central axis (88) of the coil.

According to such a configuration, the coil is wound around the outer circumferential surface of the support, and the fiber reinforced resin is wound around the coil to prevent deformation of the coil in a direction away from the central axis of the coil. This prevents the coil from being deformed by the electromagnetic force caused by the electric current and the magnetic field when a magnetic field is generated by the electric current passing through the coil. As a result, the durability of the coil unit can be improved. In addition, because of the fiber reinforced resin, the deformation of the coil can be prevented without affecting the magnetic field. In addition, by winding the fiber reinforced resin around the support and the coil, it is possible to reduce the gap between the coil unit and the rotor in comparison with the case where the coil is housed in a metal box or a metal band is wound around the coil.

Supplemental Note 2

In the magnetization device according to Supplemental Note 1, the support may be rectangular and include a first side surface (52), a second side surface (54) coupled to the first side surface, a third side surface (56) facing the first side surface and coupled to the second side surface, and a fourth side surface (58) facing the second side surface and coupled to the first side surface and the third side surface, the coil may include a first coil side (62) extending along the first side surface, a second coil side (64) coupled to the first coil side and extending along the second side surface, a third coil side (66) coupled to the second coil side and extending along the third side surface, and a fourth coil side (68) coupled to the first coil side and the third coil side and extending along the fourth side surface, and the fiber reinforced resin may include a first band-shaped body (74) wound around the support and the coil to extend between the first coil side and the third coil side, and a second band-shaped body (76) wound around the support and the coil to extend between the second coil side and the fourth coil side.

According to such a configuration, the first band-shaped body is wound around the support and the coil so as to extend between the first coil side and the third coil side, and the second band-shaped body is wound around the support and the coil so as to extend between the second coil side and the fourth coil side. This can efficiently prevent the coil from being deformed by the outward electromagnetic force acting on the first to fourth coil sides when a magnetic field is generated by the electric current passing through the coil.

Supplemental Note 3

In the magnetization device according to Supplemental Note 2, the first band-shaped body may be wound around the support and the coil to cross the central axis (88) of the coil and extend between the central portion of the first coil side and the central portion of the third coil side, and the second band-shaped body may be wound around the support and the coil to cross the central axis of the coil and extend between the central portion of the second coil side and the central portion of the fourth coil side.

According to such a configuration, when a magnetic field is generated by the electric current passing through the coil, an electromagnetic force that deforms the central portion outward acts on each of the first to fourth coil sides. Therefore, the first band-shaped body is wound to cross the central axis of the coil and extend between the central portion of the first coil side and the central portion of the third coil side, and the second band-shaped body is wound to cross the central axis of the coil and extend between the central portion of the second coil side and the central portion of the fourth coil side. This can more reliably prevent the coil from being deformed by the outward electromagnetic force acting on the first to fourth coil sides when a magnetic field is generated by the electric current passing through the coil.

Supplemental Note 4

In the magnetization device according to Supplemental Note 2 or 3, the direction of extension of fibers (70, 78) constituting the first band-shaped body may be the same as a direction in which the first band-shaped body is wound around the support and the coil, and the direction of extension of fibers (70, 82) constituting the second band-shaped body may be the same as a direction in which the second band-shaped body is wound around the support and the coil.

According to such a configuration, since the direction of the fibers constituting the first band-shaped body is the same as the winding direction of the first band-shaped body and the direction of the fibers constituting the second band-shaped body is the same as the winding direction of the second band-shaped body, when a magnetic field is generated by the electric current passing through the coil, the coil can be more reliably prevented from being deformed by the outward electromagnetic force generated at the first coil side to the fourth coil side.

Supplemental Note 5

In the magnetization device according to any one of Supplemental Notes 2 to 4, in the coil unit, the first coil side and the third coil side may extend in the axial direction of the rotor and be separated from each other in the radial direction of the rotor.

According to such a configuration, since the first coil side and the third coil side extend in the axial direction of the rotor and are separated from each other in the radial direction of the rotor, the plurality of coil units can be appropriately arranged around the rotor in correspondence with the size of the rotor and the number of poles of the rotor (the number of magnetic bodies), and the plurality of magnetic bodies can be efficiently magnetized.

Supplemental Note 6

In the magnetization device according to any one of Supplemental Notes 1 to 5, the fiber reinforced resin may be a carbon fiber reinforced resin.

According to such a configuration, the mechanical strength of the fiber reinforced resin is improved because the fiber reinforced resin is a carbon fiber reinforced resin. This reliably prevents the coil from deforming due to the electromagnetic force acting on the coil when a magnetic field is generated by the electric current passing through the coil. In addition, even if the thickness of the fiber reinforced resin is reduced, the mechanical strength sufficient to suppress the deformation of the coil can be ensured. This can prevent the gap between the coil unit and the rotor from increasing. As a result, the strength of the magnetic field applied from the coil unit to the rotor can be ensured.

Supplemental Note 7

In the magnetization device of Supplemental Note 6, the carbon fiber reinforced resin may be wound around the coil while tension is applied.

When the fiber reinforced resin is a carbon fiber reinforced resin, if the fiber reinforced resin is wound around the coil while tension is applied in the winding direction of the fiber reinforced resin, a compressive force acts on the carbon fiber reinforced resin causing the carbon fiber reinforced resin to tend to shrink. This increases the force that tries to prevent the coil from deforming. As a result, deformation of the coil can be further suppressed, and the mechanical strength of the coil unit can be improved.

Supplemental Note 8

In the magnetization device according to any one of Supplemental Notes 1, 6, and 7, the fiber reinforced resin may be wound around the support via the coil.

The fiber reinforced resin is wound around the support via the coil. That is, the fiber reinforced resin is wound around the outer circumferential surface of the coil. That is, the fiber reinforced resin is wound around the outer circumferential surface of the coil along the winding direction of the coil. This prevents the coil from being deformed by the electromagnetic force caused by the electric current and the magnetic field when a magnetic field is generated by the electric current passing through the coil.

Supplemental Note 9

In the magnetization device according to any one of Supplemental Notes 1 to 8, the coil unit may further include a covering portion (48) made of resin and covering the support, the coil, and the fiber reinforced resin.

According to such a configuration, by covering the support, the coil, and the fiber reinforced resin with the covering portion, even if the fiber reinforced resin is broken, it is possible to prevent the fibers constituting the fiber reinforced resin from scattering. In addition, since the covering portion is provided to prevent the scattering of the fibers, the thinness of the covering portion may be such a degree that the support, the coil, and the fiber reinforced resin can be covered. Therefore, the thickness of the covering portion can be reduced in comparison with the case where the coil is housed in a metal box or a metal band is wound around the coil. This can prevent the gap between the coil unit and the rotor from increasing.

The present invention is not limited to the above disclosure, and various configurations can be employed without departing from the gist of the present invention.

What is claimed is:

1. A magnetizing device configured to magnetize a plurality of magnetic bodies by applying a magnetic field to a rotor including the plurality of magnetic bodies arranged in a circumferential direction, the magnetizing device comprising at least one coil unit that generates the magnetic field, wherein
the coil unit includes:
a support;
a coil wound around an outer circumferential surface of the support; and
a fiber reinforced resin wound around the coil to prevent deformation of the coil in a direction away from a central axis of the coil.

2. The magnetizing device according to claim 1, wherein
the support is rectangular and includes a first side surface, a second side surface coupled to the first side surface, a third side surface facing the first side surface and coupled to the second side surface, and a fourth side surface facing the second side surface and coupled to the first side surface and the third side surface,
the coil includes:
a first coil side extending along the first side surface;
a second coil side coupled to the first coil side and extending along the second side surface;
a third coil side coupled to the second coil side and extending along the third side surface; and
a fourth coil side coupled to the first coil side and the third coil side and extending along the fourth side surface, and
the fiber reinforced resin includes:
a first band-shaped body wound around the support and the coil to extend between the first coil side and the third coil side; and a second band-shaped body wound around the support and the coil to extend between the second coil side and the fourth coil side.

3. The magnetizing device according to claim 2, wherein
the first band-shaped body is wound around the support and the coil to cross the central axis of the coil and extend between a central portion of the first coil side and a central portion of the third coil side, and
the second band-shaped body is wound around the support and the coil to cross the central axis of the coil and extend between a central portion of the second coil side and a central portion of the fourth coil side.

4. The magnetizing device according to claim 2, wherein
a direction of extension of fibers constituting the first band-shaped body is the same as a direction in which the first band-shaped body is wound around the support and the coil, and
a direction of extension of fibers constituting the second band-shaped body is the same as a direction in which the second band-shaped body is wound around the support and the coil.

5. The magnetizing device according to claim 2,
wherein at the coil unit, the first coil side and the third coil side extend in an axial direction of the rotor and are separated from each other in a radial direction of the rotor.

6. The magnetizing device according to claim 1,
wherein the fiber reinforced resin is a carbon fiber reinforced resin.

7. The magnetizing device according to claim 6,
wherein the carbon fiber reinforced resin is wound around the coil while tension is applied.

8. The magnetizing device according to claim 1,
wherein the fiber reinforced resin is wound around the support via the coil.

9. The magnetizing device according to claim 1,
wherein the coil unit further includes a covering portion made of resin and covering the support, the coil, and the fiber reinforced resin.

* * * * *